Oct. 29, 1968  H. M. STRONG  3,407,445
HIGH PRESSURE REACTION VESSEL FOR THE PREPARATION OF DIAMOND
Original Filed April 1, 1963.  2 Sheets-Sheet 1
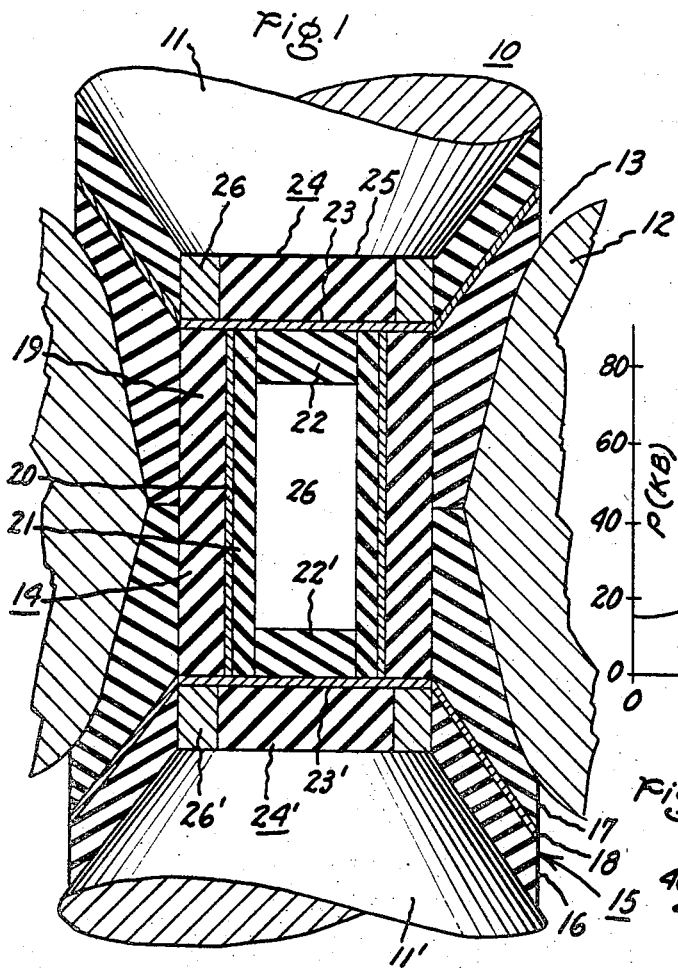
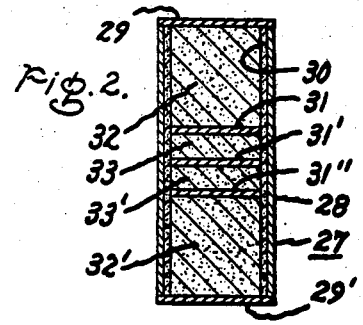
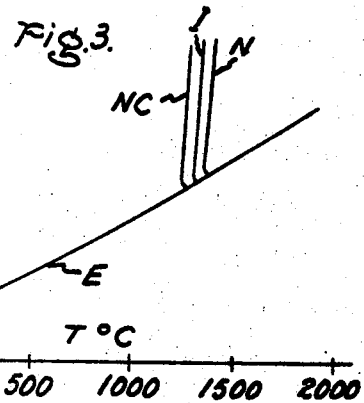
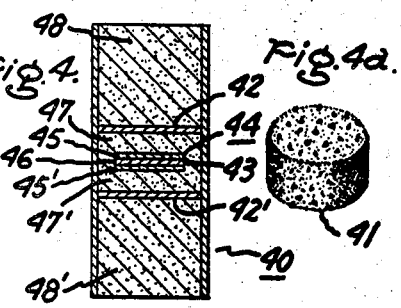
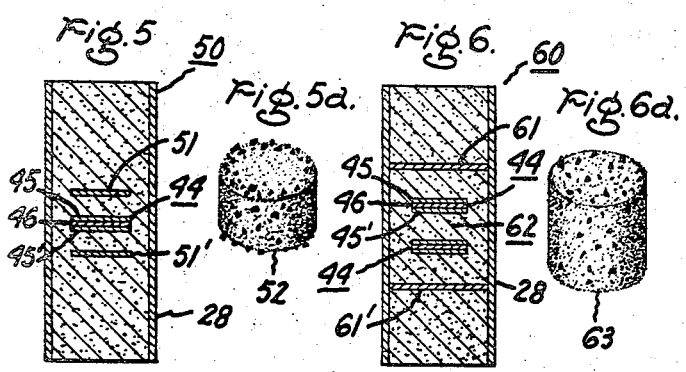
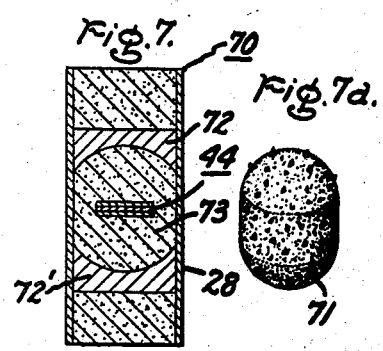
Inventor:
Herbert M. Strong,
by Leo I. Malossi
His Attorney.

Oct. 29, 1968          H. M. STRONG          3,407,445
HIGH PRESSURE REACTION VESSEL FOR THE PREPARATION OF DIAMOND
Original Filed April 1, 1963          2 Sheets-Sheet 2
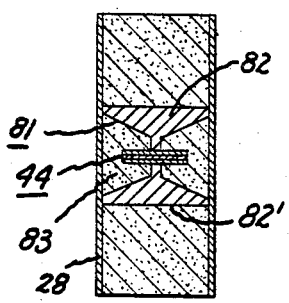
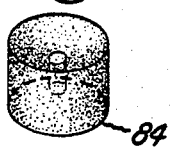
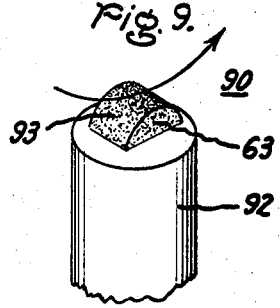
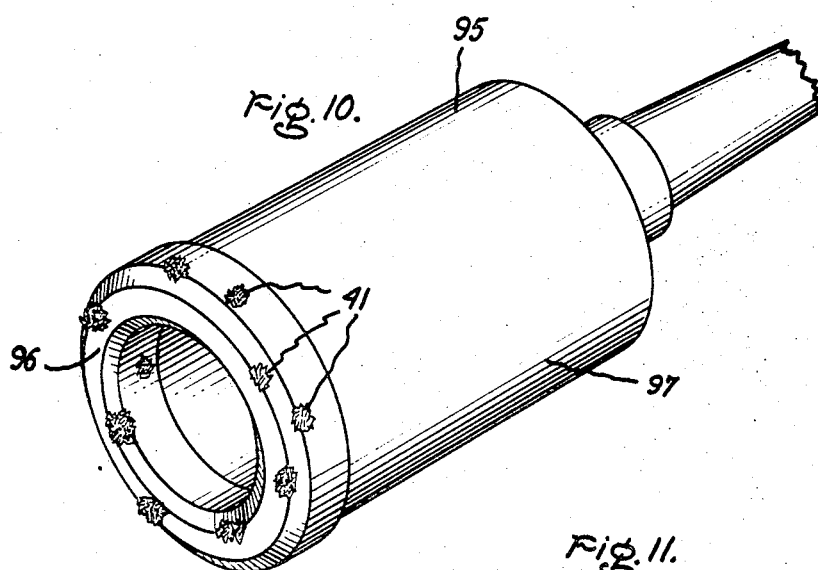
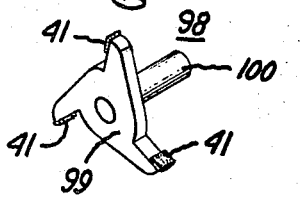
Inventor:
Herbert M. Strong,
by Leo J. MaLossi
His Attorney.

United States Patent Office 3,407,445
Patented Oct. 29, 1968

3,407,445
HIGH PRESSURE REACTION VESSEL FOR THE PREPARATION OF DIAMOND
Herbert M. Strong, Schenectady, N.Y., assignor to General Electric Company, a corporation of New York
Continuation of application Ser. No. 269,412, Apr. 1, 1963. This application Mar. 2, 1966, Ser. No. 531,284
6 Claims. (Cl. 18—34)

ABSTRACT OF THE DISCLOSURE

An improvement is described for the containment in a reaction vessel of a volume of high purity carbonaceous material-catalyst combination to be modified under the application of high pressure and heat to form diamond. The cylinder containing this carbonaceous material-catalyst is made of a metallic material selected from the group consisting of tantalum, tungsten, zirconium, titanium, nickel and nickel-base alloys and a pair of spaced discs made of metallic material selected from this same group are employed within the volume of the cylinder to define the vertical limits of a shaped charge of the carbonaceous material-catalyst. This isolation serves to protect the shaped charge from gaseous contaminants during the application of high pressure and heat with the result that better nucleation occurs within the restricted volume and diamond compacts of predetermined shapes may be produced.

---

This application is a continuation of application S.N. 269,412, filed Apr. 1, 1963 (now abandoned), which application is in turn a continuation-in-part of application S.N. 56,784, filed Sept. 19, 1960 (now abandoned), and assigned to the same assignee as the present application.

This invention relates to diamond growth involving the conversion or transformation of a carbonaceous material to diamond. More particularly, this invention relates to an improved method and apparatus which greatly facilitates nucleation of diamond at lower pressures, and also produces dense, high strength, coherent, polycrystalline compacts of small diamonds at higher pressures.

Considerable attention has been given to the many variables present in a diamond growth reaction in order to improve crystal nucleation and growth generally. Some of the variables relate to the pressure-temperature conditions required for growth, physical and chemical characteristics of the materials employed, effect of impurities on crystal growth, and arrangement of the constituents. All of the mentioned variables affect diamond nucleation and growth. In the first instance, the severe pressures and temperatures which are required for diamond growth not only subject the various apparatus parts to stresses approaching critical stress condition, but also measurably affect the range of control which may be exercised over the growth conditions at these severe temperatures and pressures. Therefore, a reduction in the pressures and temperatures required for diamond growth inherently contributes to a greater exercise of control over other variables in the growth conditions. Additionally, the removal of deleterious effects of the other variables leads to further predetermination of nucleation, single crystal growth, and multiple crystal growth generally.

Accordingly, it is an object of this invention to improve spontaneous nucleation of diamond.

It is another object of this invention to provide an improved lower pressure method of growing diamond.

It is another object of this invention to provide an improved method of providing better quality diamond crystal.

It is another object of this invention to provide a high purity method and apparatus in the production of diamond.

It is another object of this invention to provide shielding means between growing diamond and its environment.

It is another object of this invention to provide an improved diamond crystal compact.

It is a further object of this invention to provide a diamond compact with minimum matrix.

It is yet another object of this invention to provide preformed diamond compacts.

It is still another object of this invention to provide an improved diamond tool.

Briefly described this invention comprises producing diamond from a high purity carbonaceous material-catalyst combination and environment. The process is carried out in the presence of a metallic enclosure means defining the zone of diamond formation whereby foreign elements and/or impurities are eliminated therefrom. The result of this practice is that pressure-temperature conditions of diamond growth are lowered, and additionally, better nucleation is obtained.

This invention will be better understood from the following description and drawings in which:

FIG. 1 illustrates one exemplary high pressure high temperature apparatus;

FIG. 2 illustrates a preferred tube assembly for diamond growth;

FIG. 3 is a partial illustration of a phase diagram of carbon;

FIG. 4 illustrates a modified form of a capsule or assembly employed to provide improved diamond growth;

FIG. 4a is an illustration of a compact obtained from the assembly of FIG. 1;

FIG. 5 illustrates a modification of the assembly of FIG. 1;

FIG. 5a is an illustration of a compact obtained from the assembly of FIG. 5;

FIG. 6 illustrates another modification of the assembly of FIG. 4;

FIG. 6a is an illustration of a compact obtained from the assembly of FIG. 6;

FIG. 7 illustrates an assembly which provides a pill compact;

FIG. 7a is an illustration of a pill compact from the apparatus of FIG. 7;

FIG. 8 illustrates an assembly employed to provide an apertured compact;

FIG. 8a is an illustration of an apertured compact obtained from the assembly of FIG. 8;

FIG. 9 illustrates a general form of a diamond compact tool;

FIG. 10 illustrates a diamond compact boring tool; and

FIG. 11 illustrates a diamond compact cutting tool.

A suitable process for growing diamonds is described in U.S. Patents 2,947,610 Hall et al. and 2,947,609, Strong. Briefly the process includes providing a suitable non-diamond carbonaceous material, usually graphite, together with a catalyst-solvent metal which is at least one of the metals of Group VIII of the Periodic Table of elements, chromium, manganese and tantalum. The graphite-catalyst combination is then subjected to pressures and temperatures above the graphite-to-diamond equilibrium line on the phase diagram of carbon and in the range where the catalyst is molten and effective to provide transformation of growth of graphite to diamond.

One preferred form of a high pressure high temperature apparatus in which the diamond growth process of this invention may be practiced is the subject of U.S. Patent 2,941,248, Hall, and briefly described in FIG. 1. In FIG. 1, apparatus 10 includes a pair of cemented tungsten carbide punches 11 and 11' and an intermediate belt or die member 12 of the same material. Die member 12 includes an aperture 13 in which there is positioned a reaction vessel 14. Between each punch 11 and 11' and die 12, there is included a gasket assembly 15 comprising a pair of thermally insulating and electrically nonconducting pyrophyllite gaskets 16 and 17 and an intermediate metallic gasket 18.

Reaction vessel 14 is of the type disclosed in U.S. Patent 3,031,269 and in one preferred form, includes a hollow pyrophyllite cylinder 19 of approximately .930 inch length. Cylinder 19 may be of other materials such as talc, catlinite, and various salts such as NaCl. Positioned concentrically within and adjacent cylinder 19 is a graphite electrical resistance heater tube 20 of approximately .025 inch wall thickness. Within graphite heater tube 20 there is also concentrically positioned a shorter alumina liner or cylinder 21. Liner 21 may also be of various other high temperature materials including Vycor glass, magnesia, etc. The ends of the liner 21 are then fitted with a pair of plugs 22 and 22' of such comparable materials as alumina, magnesia, etc. to effectively close the ends of alumina tube 21. Electrically conductive metallic end discs 23 and 23' are utilized at each end of cylinder 19 to provide electrical connection to graphite heater tube 20. Adjacent each disc 23 and 23' is an end cap assembly 24 and 24' each comprising a pyrophyllite plug or disc 25 surrounded by an electrical conducting ring 26.

Motion of one or the other of punches 11 and 11' towards each other compresses the gasket assemblies 15 and reaction vessel 14 to raise pressure in a specimen therein denoted generally at 26. At the same time, electrical current is provided from a source (not shown) to flow through punches 11 and 11' and graphite resistance heater tube 20 in the reaction vessel 14 to indirectly heat and raise the temperature of the specimen 26.

The foregoing description relates to merely one high pressure high temperature apparatus. Various other apparatuses are capable of providing the required pressures and temperatures that may be employed within the scope of this invention.

The pressures required for diamond growth in the above-described patents (2,947,610, Hall et al. and 2,947,609, Strong) are about 75,000 atmospheres for the indicated metals of the Hall et al. patent, and about 50,000 atmospheres for the alloys of the Strong patent. In either instance, the attainment of melting of the particular metal catalysts employed denotes the minimum temperature utilized to grow diamonds. This minimum temperature has been designated to be about 1200° C.

The mentioned pressures were based on the standard of known electrical resistance changes of various metals under known pressures. For example, during the compression of barium, a definite reversible electrical resistance change will be noted at about 59 kilobars. By the same token then, the electrical resistance change in barium denotes about 59 kilobars pressure in the apparatus.

The pressure values of the resistance changes of the metals mentioned in the aforementioned patents were known generally in the art as evidenced by P. W. Bridgman "Proceedings of the American Academy of Arts and Sciences," vol. 81, IV, pages 165–251, March 1952, vol. 74, page 425, 1942, vol. 76, page 1, 1945, and vol. 76, page 55, 1948. The Bridgman values were later corrected to more accurate terms, see R. A. Fitch, T. F. Slykhouse, H. G. Drickamer, Journal of Optical Society of America, vol. 47, No. 11, pages 1015–1017, November 1957, and A. S. Balchan and H. G. Drickamer, Review of Scientific Instruments, vol. 32, No. 3, pages 308–313, March 1961.

The corrected values as employed in this invention for pressure calibration purposes are given in the following table, and in terms of kilobars as a more accepted measurement in the art:

TABLE 1

| Metal: | Transition pressure (kilobars) at room temperature |
|---|---|
| Bismuth [1] I→II | 25 |
| Thallium [1] II→III | 37 |
| Cesium | 42 |
| Barium [1] II→III | 59 |
| Bismuth [1] | 89 |

[1] Since some metals indicate several transitions with increasing pressure, the Roman numerals indicate the transition utilized, in sequential order.

The particular pressure calibration technique utilized for the press apparatus described is also similar to that as given in the aforementioned patents. Briefly, this technique involves providing a suitable curve of the press load required, for example, hydraulic pressure in pounds/square inch, to provide the described electrical resistance change which in turn denotes the approximate pressure in the reaction vessel. A more complete description of the calibration method as well as methods of determining phase change values is found in "Calibration Techniques in Ultrahigh Pressures," F. P. Bundy, Journal of Engineering for Industry, May 1961, Transactions of the ASME, Series B.

Temperature calibration may follow the teachings as given in the aforementioned Hall and Strong patents where thermocouples are inserted through the non-metallic portions of the gaskets and reaction vessel parts and adjacent the specimen. Alternatively, by heating various metals in the apparatus to their melting points, as determined by electrical resistance changes, a melting or temperature curve may be obtained. Various other methods also known in the art as well as thermal calculations may be employed. In the present invention both the melting point method and the direct thermocouple method were previously employed and compared.

In the practice of growing diamonds as above described, it has been unexpectedly discovered that method and particular combinations of method and apparatus will provide under specified conditions (1) improved nucleation and diamond growth at lower pressures, (2) better quality single diamond crystals, and (3) improved diamond compact.

The particular characteristic that provides the above mentioned features is purity. By purity, it is meant that all materials in the press apparatus should not contain any foreign elements which adversely affect the diamond growth reaction. At the extremely high pressures and temperatures which are required for diamond growth, the envionmental parts including adjacent metals and stone-like materials, such as catlinite, talc, pyrophyllite, etc., decompose, give off gaseous elements, melt, etc., and the resultant products progress into the carbonaceous material-catalyst combination to seriously affect the transformation of carbonaceous material or growth of diamond. Under these conditions, the diamond growth reaction is sufficiently affected so that ordinarily a poor quality crystal is produced in a given run or that a reduced amount of diamond is obtained. Some of the impurities which seriously affect the diamond growth reaction have been found to be such gases as oxygen, hydrogen and nitrogen, carbon dioxide and also water vapor, and sulphurous compounds. In controlled runs, those reaction vessels and gaskets from which these mentioned gases and materials have been removed produced striking results in improved nucleation and crystal quality. Alternately, where materials which release these impurities have been added to a reaction vessel very poor results were obtained. Therefore, one salient feature of this invention is purity of materials. For example, if diamond were to be produced from a graphite-iron combination it would be desirable to have both the graphite and iron theoretically pure, and furthermore it would be desirable that these materials remain in the pure state throughout the growth process.

Materials of high purity are those which are commercially obtainable as high purity materials considering that higher purity gives better results. Insofar as catalyst metals are concerned, these metals as employed singly or for alloys are at least 99.99% pure and have very low oxygen content and very low content of other nonmetallic substances. For example, high purity iron as employed in the practice of this invention, contains less than about .002 percent oxygen. The graphite which is employed as the starting carbonaceous material is usually graphite of spectroscopic purity having 2 to 5 parts per million impurities. All stones and ceramics are also as clean or as pure as possible. In both the metals and nonmetals involved, it is desired that such contaminants as oxygen, hydrogen, nitrogen, carbon monoxide, carbon dioxide, water vapor, and sulphur be maintained at a minimum value.

Good results are obtained when the assembly parts, i.e., the gaskets, reaction vessel, and reactants are subjected to a further cleaning step prior to their use. Such a step as employed in the practice of this invention is a high temperature vacuum bake out operation. For example, all metal parts are placed in a furnace and heated to a temperature of about 1000° C. for a period of time of about 5 to 20 minutes. At the same time the parts are subjected to evacuated conditions in the furnace at a pressure of about $10^{-4}$ to $10^{-6}$ mm. Hg. The nonmetal parts are also subjected to the same treatment but at higher temperatures, i.e., about 2000° C.–3000° C. for graphite and 500° C.–1000° C. for the stone parts. A salt vessel (cylinder 21) of NaCl may be obtained in a very clean state and does not require the high temperature bake out. However, a 450° C. bake out can be used if desired. The cleaned parts may then be stored as parts or as assemblies in an inert gas atmosphere until use. Where the parts are assembled as illustrated in FIG. 1, the assembly as a unit may be subjected to a high temperature vacuum bake out but at temperatures limited to about 1000° C. and then covered or stored under argon prior to use.

The practice of this invention at high pressures and high temperatures leads to a release of contaminants not ordinarily removed at less severe conditions by pre-cleaning processes. For example, these contaminants may be products of decompositions or other reactions at high pressures and high temperatures such as gases, solids, and molten materials. It has been discovered that when shielding means is employed in combination with high purity materials improved and lower pressure diamond nucleation and a full diamond high strength compact of predetermined form is provided.

The shielding means of this invention, in one form, is an enclosure tube member cooperating with upper and lower members to contain the graphite-metal catalyst combination. Under the conditions of the reaction of graphite conversion to diamond the shielding means acts as a barrier means against the influx of contaminants to the reactants. One example of a shielding means is the tube enclosure 27 of FIG. 2. In FIG. 2, enclosure 27 includes a high purity tantalum tube 28 of .005 to .020 inch wall thickness and preferably .010 inch, and closing tantalum end discs 29 and 29'. This tube assembly 27 is concentrically fitted into liner 21 of FIG. 1. It is understood, however, that enclosure 27 may take various configurations, such as a sphere, cube, retangular parallelepiped, tube, and various other geometrical and irregular hollow shapes. The barrier or shield, whether as a partial or full enclosure, capsule, jacket, etc., should be preferably of a metallic material and of a material which will undergo extreme compression or deformation while yet maintaining its geometric integrity during the diamond making process. Such a barrier must not crack or crumble as may occur with graphite or alumina, and generally must not substantially enter into the reaction or transformation of graphite to diamond.

Not all metals are suitable for such a shield, because it is preferred that the metal not melt, or have an equivalent or higher melting point than that temperature (in combination with pressure) at which diamonds are grown, so that the metal itself does not substantially enter into the diamond reaction. Specific examples of shield materials employed in accordance with the teachings of this invention are tantalum, tungsten, titanium, zirconium, nickel, nickel-iron alloys and other nickel base alloys, for example, nickel-chrome alloys, iron-nickel-chrome alloys, etc. Various other combinations of metals may also be employed and the metal may be one of the catalyst metals where the catalyst being employed for the diamond reaction has a similar or lower melting point. Ordinarily, any metal may be so employed where the shield material serves to prevent leakage of other contaminating materials therethrough. The choice of a particular metal should also be influenced by the gettering activity of the metal with respect to the mentioned gases. Accordingly, best results are obtained with the higher melting point metals such as tantalum, tungsten, zirconium, and titanium. Those nonmetals which will also accomplish the desired results and objectives may also be employed. A barrier in solid form is preferable to a molten one which may flow into and deleteriously affect or rupture to provide openings for contaminant admission.

It has been discovered that the use of such a shield means reduces the pressure required to initiate diamond growth and greatly increases the yield of diamond obtained. For example, when employing the reaction vessel of FIG. 1 without a tube assembly 27 of FIG. 2 therein for diamond growth, the defined volume is not filled with diamond, i.e., full nucleation is not obtained. Furthermore, when longer runs are employed for controlled diamond growth, for example 30 minutes and more, cracking or rupture of refractory liners 21 with impurities entering the reactants is prevalent. With a preferred metal tube assembly 27 in liner 21, the metal flows and deforms without tearing or cracking, and such tubes are, therefore, important to controlled growth of diamonds for larger, more perfect crystals, and greater yield. The use of a metal barrier, under identical conditions with non-barrier diamond growth, provides about a 10 percent increase in yield in commercial production of diamond crystals.

The practice of this invention with respect to shielding means and purity leads to a marked reduction in the pressure necessary to provide diamonds, and in addition, provides diamonds of exceptional clarity. Insofar as a reduction in pressure is concerned, diamonds have been grown in a graphite-iron combination in accordance with the practice of this invention as low as about 47 kilobars. This is to be taken into consideration in connection with the required pressure for iron, as given in the aforementioned Hall patent, where the minimum pressure is 75,000 atmospheres or 57 to 58 kilobars. In these pressure measurements, the apparatus was calibrated as before described with relation to the given metals. Thereafter, controlled runs were made to provide diamond as indicated in the aforementioned Hall patent. Under the same conditions, the practice of this invention was carried out and it was noted that the pressure necessary to produce diamond was markedly reduced.

A representative example of the practice of this invention with respect to lower required pressure and purity is as follows:

*Example 1*

The tube assembly of FIG. 2 was employed to fit concentrically within liner 21 of FIG. 1. Tube 28 was of commercially available high purity tantalum of 99.99% purity. Within tube 28 there was concentrically positioned a thin wall (.030 inch) graphite liner tube 30. Three discs 31, 31', and 31" of commercially available high purity iron of 99.99% iron were placed in equidistant relationship concentrically in about the mid ⅓ length of tube 30. These iron discs were 3/16 inch diameter and .005 inch thick. The remaining spaces in tube 30 were filled with compressed cylindrical blocks 32 and 32' and 33 and 33' of high density (2.0 to 2.1 gms./cm.$^3$) graphite of spectroscopic purity. In this instance, graphite liner 30 is employed so that under high temperature high pressure conditions iron discs 31, 31', and 31" do not touch the wall of tube 28 and form a lower melting temperature alloy for diamond growth.

The high temperature vacuum bake out process as described was practiced on the components of the assembly. Maximum temperature was about 2000° C. for graphite parts and 1000° C. for metal parts. Thereafter, the FIG. 1–FIG. 2 composite was subjected to a pressure of about 50 kilobars as obtained by the calibration system described, and a temperature of 1100° C. to 1200° C. After 5 minutes at this temperature, for temperature and pressure stabilization purposes, the temperature was increased to about 1330° C. After remaining at these conditions for a short period of time (20 minutes) temperature and pressure were reduced and diamonds were recovered from the reaction vessel.

This example refers to a series of identical examples where after diamonds are grown at a predetermined pressure and temperature duplicate examples are performed at the same pressure but at varying temperatures to determine minimum temperature, and a temperature range for diamond growth. Thereafter, a further example is performed at a lower pressure and again a temperature range is established. Such a series leads to the lowest pressure and temperature values where the graphite is converted to diamond. More detailed results of this type of experimental practice to determine growth and no growth conditions of diamond are found in "Diamond-Graphite Equilibrium Line From Growth and Graphitization of Diamond," Bundy et al., Journal of Chemical Physics, volume 35, No. 2, pages 383–391, August 1961. In the above example, utilizing iron as a catalyst, growth conditions have been observed downward to about 47 kilobars.

Additional examples utilizing other single metal catalysts and also alloys are given as follows, each example being representative of several duplicate examples at different conditions as described for Example 1.

*Example 2*

Example 1 was repeated utilizing nickel for discs 31, 31', and 31". The assembly was vacuum baked as described for Example 1 and subjected to a pressure of about 51 kilobars and a temperature of about 1350° C. for about 20 minutes. About 100 diamond crystals were recovered from this example with crystals size being from very small to about ¼ mm. As for Example 1, a great number of examples were performed using nickel as a catalyst. These experiments fully defined an area of pressures and temperatures for diamond growth.

*Example 3*

The apparatus of FIGS. 1 and 2 were employed with the exception that disc 31, 31', and 31" and graphite blocks 33 and 33' were absent from tube 28. Instead the center ⅓ portion of tube 28 was filled with a tamped mixture of graphite and manganese and nickel in chip form, the chips being about .002 inch in size. The ratio of chips was such to provide about a 60 weight percent Mn, and 40 weight percent Ni alloy. The ratio of metal to graphite was about 7 percent metal by volume. The components of the entire assembly were subjected to vacuum bake out as described for Example 1. Thereafter, the sample was subjected to a pressure of 46 to 47 kilobars and 1000° C. for about 20 minutes. Temperature was then raised to about 1170° C. to 1200° C. and maintained for about 30 minutes. Temperature and pressure were then reduced and diamond crystals were recovered from the reaction vessel. This example was repeated several times with slight variations in pressures and temperatures.

*Example 4*

Example 3 was repeated at 45 to 47 kilobars with a preheat cycle of 20 minutes at 1000° C. Thereafter, temperature was raised to about 1150° C. to 1180° for a 30-minute period. After temperature and pressure were reduced diamond was recovered from the reaction vessel.

*Example 5*

Example 3 was repeated with a 20-minute preheat cycle at 1000° C. and 49 kilobars. Thereafter, the heating power was turned off and the sample allowed to partially cool. Then the power was turned on to produce a maximum temperautre of about 1175° C. which was continued for about 30 minutes. Thereafter the temperature and pressure were reduced and a large amount of diamond crystals was recovered from the reaction vessel.

*Example 6*

Example 3 was repeated with a 20-minute preheat cycle at 1000° C. and 46 kilobars. Thereafter temperature was raised to 1150° C. to 1180° C. After reducing the temperature and pressure diamonds were recovered from the reaction vessel.

*Example 7*

In the center ⅓ of the tube assembly there was placed a small diamond seed crystal wrapped in a 0.002 inch thick foil strip of 50 weight percent iron and 50 weight percent nickel. The assembly was subjected to a pressure of about 50 kilobars at 1000° C. for about 20 minutes. Thereafter temperature was raised to about 1290° C. to 1300° C. for 20 minutes. After reducing the temperature and pressure the foil was recovered from the reaction vessel with profuse diamond crystal growth thereon.

*Example 8*

In the center ⅓ of the tube assembly of FIG. 2 (with discs 31, 31', and 31" and graphite blocks 33 and 33' removed) there was placed a tamped mixture of powdered iron, powdered nickel, and powdered graphite. The iron and nickel were each in a 50 weight percent amount for the metal, while the metal to graphite atomic ratio was about 15:1. The assembly was subjected to 48 kilobars pressure and preheated at 1150° C. for about 30 minutes. Thereafter temperature was raised to about 1250° C. and maintained for 20 minutes. After temperature and pressure were reduced diamond was recovered from the reaction vessel.

Lower pressure diamond nucleation has also been obtained for the various other metals known as diamond catalysts. However, of the Group VIII metals, the lower melting point metals are the more practical ones to be utilized for diamond growth since they do not require the severe temperature conditions which are difficult to maintain and control. In other words, a given catalyst which formerly required a minimum of about 58 kilobars pressure for diamond formation may now be employed at say 50–52 kilobars. In the absence of any unique characteristics to be obtained by the use of a given metal there are no advantages to be obtained, insofar as the practice of this invention is concerned, in using the described metal requiring 58 kilobars pressure over one that is now operable at lower pressures, for example in the 45 kilobar range, where more control can be exercised. In the practice of this invention at the lower pressures the arrangement of the graphite-catalyst combination in the reaction vessel is not important. Therefore, various other arrangements are contemplated and FIG. 2 is one preferred arrangement which facilitates assembly, operation, etc.

A more specific range of operation for the practice of this invention with respect to lower pressures and purity is described with relation to FIG. 3. Referring now to FIG. 3, there is disclosed a phase diagram of carbon with a curve E representing the dividing line or equilibrium line between graphite and diamond. The ordinate denotes pressure in kilobars and the abscissa denotes temperature in ° C. Generally, the practice of this invention includes the subjection of a carbonaceous material such as graphite for example, and a designated catalyst metal, to pressures and temperatures above the equilibrium line E for a short period of time to provide diamond growth. Each particular catalyst metal or combination of catalyst metals defines a particular portion of the area above the equilibrium line wherein diamond growth occurs. For example, curve N is that curve for a nickel catalyst wherein diamonds may be grown. By the same token, curve I is that curve defining diamond growth when utilizing iron as a catalyst. Ordinarily, numerous materials will provide corresponding numerous curves designating lower areas of pressure and temperature wherein diamond growth may occur. For example, one such curve N–C (for 80 weight percent nickel and 20 weight percent chrome as an alloy) defines a curve approaching the 1200° C. line as a temperature minimum and the 47 kilobar line as a pressure minimum.

As can be seen, these curves leave a considerable portion of the area above the graphite-to-diamond equilibrium line and at lower pressures where diamond growth may occur. The equilibrium line E crosses the ambient temperature point at about 17 kilobars. The lower part of curve E has been defined by thermodynamic calculations, and the upper part by controlled experiments on the growth and graphitization of diamond at varying pressures and temperatures. See Bundy et al. publication supra. It can be seen that the practice of this invention is particularly applicable for those pressures between about 17 kilobars and 57–58 kilobars for the use of single metals as catalysts which are molten or catalytic at required equivalent temperature, and, between 17 kilobars and about 40 kilobars for alloy materials.

It has been discovered that the practice of this invention carried on at much higher pressures results in such full and spontaneous nucleation that the shield member is completely filled with a polycrystalline diamond mass which is very tough, durable, coherent and which may be directly employed as a grinding or cutting tool. This polycrystalline mass is composed of numerous small diamond crystals which in many instances appear to be not only interlocked but grown together with little if any voids or interstices which would weaken the structure. In other words, the compacts so grown appear to be molded to the exact shape and size of the shield form. By this means, therefore, diamonds can be grown in the compact form of a predetermined size, shape, or form.

Various compact and capsule configurations are illustrated in FIGS. 4–8. In these figures, the general shape of a cylinder is so chosen because it lends itself easily to the reaction volume configuration of the reaction vessel and because it facilitates mounting in tool holders where compacts are provided.

In FIG. 4, the illustrated configuration or capsule 40 provides a disc-like compact or short cylindrical compact 41 (FIG. 4a). Capsule 40 includes a barrier or shield member in the form of a metal tube 28 as in FIG. 2. Tube 28 contains a pair of spaced apart end discs 42 and 42' which, with tube 28, defines a short cylindrical volume 43. Within volume 43 there is positioned the carbonaceous material-catalyst combination. The combination comprises a catalyst assembly 44 which includes alternately arranged nickel and iron discs 45 and 46, respectively, and confining graphite blocks 47 and 47'. The remaining portion of tube 28 is filled with graphite blocks 48 and 48', although graphite, specifically, is unnecessary because either no diamonds are intended to be grown there or, if desired, another graphite-catalyst arrangement is placed therein.

FIG. 5 discloses a modified capsule 50. In FIG. 5, end discs 51 and 51' are of the same metal as tube 28 and also of a smaller diameter than the internal diameter of tube 28. This arrangement provides a full growth compact 52 with more irregular edges as illustrated in FIG. 5a. The fact that discs 45, 45' and 46 are of reduced diameter and do not touch tube 28 reduces alloying of the catalyst and tube. Furthermore, diamonds grown around discs 51 and 51' between the disc and tube 28 wall leaving exposed upper portions of discs 51 and 51' which facilitate joining of the compact by soldering, brazing, etc. Suitable graphite blocks are machined to fit the remaining space in tube 28.

When an elongated cylindrical compact is desired, the capsule modification 60 of FIG. 6 may be employed. In FIG. 6, tube 28 includes end discs 61 and 61' spaced apart to define an elongated volume 62. Volume 62 in this instance contains spaced apart catalyst disc assemblies 44 while the remaining portion is filled with machined-to-fit graphite blocks. Such a volume 62 provides a high strength diamond compact of equivalent dimensions (after compression). A compact 63 obtained from the capsule of FIG. 6 is shown in FIG. 6a.

In FIG. 7, there is shown an arrangement 70 utilized to provide a pill shape or cylindrical compact with hemispherical ends. Such a shape as illustrated by compact 71 in FIG. 7a is desirable for drill bit end mountings. Tube 28 contains a pair of spaced end members 72 and 72' in the form of thick discs having hemispherical portions removed therefrom. These spaced apart members 72 and 72' define a generally pill shaped volume 73 which contains the usual carbonaceous material-catalyst combination 44. The remaining space is filled with graphite blocks.

Compacts obtained by the teachings of this invention are not limited to solid configurations since many hollow configurations are also obtained for various applications. One example of a hollow configuration generally, or one having holes, openings or otherwise removed portions, is illustrated by the capsule 80 in FIG. 8.

In FIG. 8, tube 28 includes therein a spool or reel-like member 81 comprising a pair of parts 82 and 82' as one example. Spool member 81 together with tube 28 defines an annular volume 83. Within annular volume 83 is the usual carbonaceous material-catalyst combination. In this instance, however, catalyst disc assembly 44 is provided with a central aperture to fit the spool member 81. Graphite blocks fill the remaining space. The compact obtained from such a configuration may then be employed, for example, as a wire drawing die, and such a compact 84 is shown in FIG. 8a.

It is to be understood that the carbonaceous material-catalyst combination has no particular or critical form. Best results have been obtained in the practice of this invention when the illustrated catalyst arrangements have been employed. However, the catalysts may be in the form of, for example, spheres, wires, tubes, etc., and take various positions in the reaction volume.

The compacts as described may be suitably attached to a tool holder and employed for cutting and grinding purposes. FIG. 9 is exemplary of a tool 90 which includes a compact, for example, 63 of FIG. 6a, employed as a grinding element in support 92. In this instance, the side or cylindrical surface 93 of the compact 63 is employed as the grinding surface. However, the compact may also be mounted for an edge to be projected or engage the material to be removed. The tool of FIG. 9 has been employed as a grinding wheel dresser with satisfactory results compared with current diamond matrix type wheel dressers or Carboloy cemented carbide dressers.

A further type of grinding tool is illustrated in FIG. 10 as a boring tool 95. Tool 95 may be employed as a boring or drilling implement, for example, as a stone drill. A plurality of compacts 41 from FIG. 4, for example, are mounted on an annular flange member 96, internally and externally, in various positions, so that when fixed to a cylindrical support 97 and rotated with the flange member against rock, for example, the flange member drills an annulus in which the support 97 may enter. The type of tool illustrated is merely exemplary of many types of rock drills and has been employed to drill holes in granite and marble with excellent results.

FIG. 11 illustrates a cutter type of tool 98 which facilitates cutting or grinding of rubber materials. Rubber is difficult to cut with metal implements because of its quick dulling and clogging characteristics. The diamond tool of FIG. 11 includes a support member or wheel 99 having a plurality of diamond compacts 41, for example, affixed thereto. The support is suitably attached to a shaft 100 so that the assembly may be rotated. This cutter wheel has been employed to cut and dress rubber materials, for example, automobile tires over extended periods of time without dulling or clogging.

In addition to the described configurations as employed and preferred to provide diamond compacts, certain process features are also required. In general, diamond compacts require "over pressure" more than necessary for just initiating diamond growth. Excess pressure is necessary to encourage very rapid diamond growth and to insure that the volume loss resulting from the growth of diamond from graphite, i.e., volume diminution, which has already occurred will not reduce the overall pressure below that which is necessary for continuing the growth process until the intended space or volume is filled. Rapid growth results in producing a mass of small nested crystals.

Often, the crystal mass exhibits a complex interlocked, intertwining structure. Under those conditions where the crystals were not substantially interlocked by twining, they were found to be bound together with metal catalyst similar to the manner in which cement binds sand and gravel together. The interlocking type twining is more prevalent when iron and nickel are used as a catalyst as separate pairs of discs or as an alloy. Ordinarily, the diamond compact crystals are usually of a dark color or black and resemble natural "ballas" diamond.

A tantalum tube and end disc configuration also encourage interlocking growth and especially where the tantalum shows evidence of having alloyed with nickel, for example. Compacts have also been grown in various tubes including relatively low melting temperature nickel tubes with nickel discs as a catalyst. In these instances, the crystals were usually of a transparent yellow color and of good individual crystal quality. However, the nickel tube-nickel disc configuration provides a compact where the individual crystals are more bound by a metal matrix than by intertwining.

The diamond crystals of the compact are grown well inside the general region of diamond stability. At a given pressure, raising the temperature has the effect of moving the system closer to the equilibrium line between graphite and diamond so that the amount of growth is reduced, but the crystals are much better in appearance from the standpoint of good single crystal quality. On the low temperature side, the crystals tend to be black and with complex twining when a tantalum tube with alloys including iron and nickel are employed. It is thus seen that for different compact application, the process may be varied to provide control over the type of crystal and the type of bonding.

In growing compacts it is desirable that the diamonds grow rapidly at higher pressures. This rapid growth commences at the graphite-catalyst combination and spreads outwardly to the shield. During this growth, it is preferable that the tube 28 not melt and enter into the reaction. Consequently, a larger difference in melting temperatures of the catalyst metal and tube 28 metal is also preferable so that the temperature employed for diamond growth is less than the melting temperature of the tube metal, and growth conditions are sufficiently rapid to minimize any substantial alloying of catalyst metal and tube 28 metal.

Specific examples of the teachings of this invention as related to compact growth are given as follows. In all examples, graphite of spectroscopic purity was employed as a preferred form of carbonaceous material. Density of the graphite was about 1.7 grams/cm.$^3$ and was employed in rod form and machined to fit. All metals employed were of commercially obtainable high purity. Ordinarily, volume dimension or other spacings are not critical since variations of these measurements within the confines of the reaction volume as disclosed yield a high strength compact in all instances.

In the following examples as noted, a ratcheting procedure was followed. This procedure includes increasing the pressure on the reaction vessel at room temperature to about 58 kilobars and then to apply electrical power to bring the temperature up to about 1200° C. for extended periods of time and usually about 10 minutes. The electrical power was then interrupted for about 2 minutes and thereafter reestablished to bring the temperature up to the required temperature. This procedure leads to precompression of all deformable material between the punches and attainment of any phase changes, and thus compensates for volume changes. This is evident because, after interruption of electrical power, there is continued movement or sinking in the punches. Full and constant pressure is thus obtained on the second heat cycle. Some additional bake out of impurities may also occur.

*Example 9*

The arrangement of FIGS. 1 and 4 was employed utilizing a tantalum tube 28 of .020 inch wall thickness and .25 inch internal diameter. A pair of tantalum discs 42 and 42' of .020 inch thickness and .250 inch diameter were concentrically positioned within tube 28 with a spaced apart dimension of about .120 inch. Between and spaced from the tantalum discs there was concentrically positioned a catalyst assembly 44 consisting of two commercially pure nickel discs 45 of .002 inch thickness and .180 inch diameter, and an intermediate commercially pure iron disc 46 of .020 inch thickness and .180 inch diameter. The catalyst discs are slightly smaller in diameter than the internal diameter of tube 28 in order to provide more irregular edge compact growth and reduce tendency of the disc alloying with the tube or spreading there along in a thin film to give scattered diamond growth. The remaining defined volume was filled with graphite of spectroscopic purity comprising about 1 gram total. In practice, a graphite disc for example disc 47' is recessed to receive the catalyst disc assembly 44. The remainder of the tube was also filled with graphite blocks 48 and 48' but more or less as a filler material for the volume indicated. This assembly was then placed in the reaction volume, i.e., inside liner 21 of the reaction vessel 14 of FIG. 1, and by means of a press apparatus 10, subjected slowly to about 58 kilobars pressure and about 1300° C. to 1400° C. temperature. In about 3 minutes diamonds started to grow and continued to grow for the subsequent 15 to 30 minutes (as indicated by punch travel of .002 to .004 inch occurring during growth). A compact was thereafter removed which was of very high strength in the form illustrated in FIG. 4a.

The compact as grown by Example 9 was generally opaque, black, and very tightly filled and bulged the tantalum tube enclosure 28. The tube 28 was then stripped off. It appeared that all traces of graphite had converted to diamond in the defined volume with diamond surface or surfaces adjacent the tantalum giving the appearance of coarse leather. The crystal structure was that of a very tight interlocked, intergrown crystals. The structure or compact was employed to dress a corundum wheel with no damage or other deleterious effect on the compact.

Example 10

Example 9 was repeated, except that the tantalum discs 42 and 42' were positioned with substantially less spaced apart dimension. Pressure and temperature were stabilized about 58 kilobars and 1200° C., respectively for about 10 minutes. Electrical power was then turned off and the reaction vessel permitted to cool to about room temperature. Thereafter, temperature was raised quickly (30 minutes) to about 1350° C. After about 30 minutes, these conditions were abated and a diamond compact removed from the reaction vessel.

Example 11

Example 9 was repeated. Pressure was stabilized at about 58 kilobars and temperature at 1200° C. After ratcheting, temperature was increased to between 1300° C. to 1400° C. for about 25 minutes. After these temperature-pressure conditions were reduced, a full slug diamond compact was obtained.

Example 12

Example 9 was repeated. Pressure and temperature were stabilized at about 58 kilobars and 1300° C. for about 10 minutes. After ratcheting, temperature was raised to about 1375° C. for about 27 minutes. Final pressure was about 58 kilobars. After about 10 minutes, the temperature-pressure conditions were reduced and a compact removed from the reaction vessel. This compact was sharply molded, about 4 mm. in length and ¼ inch in diameter. Some exposed crystals were greater than ½ mm. across their longest dimension.

Example 13

In the tantalum tube 28 of FIG. 5, there was positioned in spaced apart relationship a pair of tantalum discs 51 and 51' of .02 inch thickness and .180 inch diameter. A catalyst assembly 49 was positioned equally space between the said tantalum discs and consisted of a pair of nickel discs of .0020 inch thickness and .180 inch diameter and an intermediate and contiguous iron disc of .02 inch thickness and .180 inch diameter. Pressure and temperature were set at 58 kilobars and 1300° C., respectively for about 10 minutes. After ratcheting, temperature was raised to about 1400° C. for about 40 minutes. After these temperature-pressure conditions were reduced, a good solid compact was obtained. The compact grew outwardly from between the tantalum discs and tube wall. The compact measured about ½ cm. long and 6 mm. diameter and .7 cm. long including the outgrowth. Some of the diamond crystal faces at the ends were 2 mm. in the largest dimension.

Example 14

Example 13 was repeated except that the tantalum discs 43 and 43' were more separated (5 mm.). Pressure and temperature were stabilized at about 58 kilobars and 1300° C. After ratcheting, the temperature was increased to about 1350° C.–1450° C. for about 42 minutes. After removal of these conditions, a compact was obtained from the reaction vessel. The compact did not press against the tantalum discs as in previous examples and was about 4 mm. long.

Example 15

Example 14 was repeated. Pressure and temperature were stabilized at about 58 kilobars and 1300° C. After ratcheting, the temperature was raised to about 1400° C. for about 12 minutes. After removal of these conditions, a compact was obtained which was similar to that of Example 6.

Example 16

Referring to FIG. 6, a tantalum tube 28 was employed together with a pair of spaced apart tantalum discs 61 and 61' of .020 inch thickness and .25 inch in diameter. A pair of catalyst disc assemblies was concentrically placed, equally spaced, between the tantalum discs. The remainder of the space in the tube was filled with graphite. Total weight of graphite between the tantalum discs 61 and 61' was .540 gram. Each catalyst assembly includes three discs in concentric contiguous relationship, i.e., a pair of nickel discs 45 of .002 inch thickness and .180 inch diameter and an intermediate iron disc 46. The assembled capsule 60 was placed in the reaction vessel of FIG. 1 and pressure and temperature stabilized at about 58 kilobars and 1250° C. These conditions were maintained about 15 minutes after which the temperature was raised to about 1370° C. After a total time of about 42 minutes at these conditions, temperature and pressure were reduced and a compact was obtained from the reaction vessel. All graphite was transformed to diamond providing an excellent tough skinned growth.

Example 17

Example 16 was repeated with a pressure and temperature stabilization of 58 kilobars and 1250° C. After about 20 minutes, temperature was raised to 1360° C., and these conditions maintained for about 42 minutes. Temperature and pressure were lowered and a diamond compact was obtained from the reaction vessel similar to that of Example 15.

Example 18

Example 16 was repeated with a pressure and temperature stabilization at 58 kilobars and 1250° C. After about 20 minutes, temperature was increased to 1340° C., with a final pressure at 57 kilobars. These conditions were maintained about 43 minutes and, after lowering the temperature and pressure, a diamond compact was obtained from the reaction vessel. The compact was similar to those obtained from Examples 16 and 17 and were generally ¼ inch in diameter and ¼ inch in length.

Examples 16, 17, and 18 were repeated several times with less stabilization time and less overall time, i.e., runs of 15 to 30 minutes duration. No appreciable changes in compacts were noted.

Example 19

A nickel tube similar to tube 28 and of about .280 inch O.D. and .250 inch I.D. and about .780 inch long was employed. Nichrome discs (80% Ni, 20% Cr), 0.25 inch diameter and 0.005 inch thickness were utilized as catalysts. Graphite slugs of approximately 0.25 inch diameter and 0.15 inch length served as the carbonaceous material. Six graphite slugs and five Nichrome discs were concentrically positioned in the nickel tube in alternate stacked relationship. The assembled tube was placed in the reaction vessel of the apparatus of FIG. 1 and subjected to about 62 kilobars pressure and 1370° C. These conditions were maintained for about 20 minutes and after lowering of conditions a compact was obtained from the reaction vessel.

Example 20

The nickel tube of Example 19 was employed with alternate graphite and nickel discs (.005 inch in thickness). Pressure was 62 kilobars and temperature 1390° C. These conditions were maintained about 20 minutes and after lowering, a diamond compact of ⅜ inch in length was obtained.

Example 21

Example 20 was repeated with cobalt discs of .005 inch in thickness and a final temperature of 1410° C. A good compact was obtained.

Example 22

A nickel tube as in Example 19 was employed. Three catalyst assemblies were utilized, each of which includes a nickel disc of .005 inch in thickness and .25 inch in diameter and an iron disc of about .005 inch in thickness and .180 inch in diameter. These assemblies were concentrically positioned in the nickel tube in equal spaced apart relationship with alternate discs of graphite. Pressure and temperature were about 62 kilobars and 1370° C., respectively. These conditions were maintained about 20 minutes and a good compact was obtained.

In general, a temperature too low provides diamond formation in several agglomerates and not a full pill. Temperatures too high grow good clear crystals but scattered.

The uses to which such a compact may be applied are numerous and in effect parallel the general usage of natural diamonds, particularly as grinding and cutting elements, wheels, saws, etc., whether for metals or nonmetals. The fact that the compact is large means long life and the fact that it is of high strength means that breakage and crumbling is reduced to a minimum. The large size means reduced economy and more satisfactory operation than the plurality of diamond-metal matrix type.

An important feature of the compact portion of this invention is bonding or otherwise joining the compact to a suitable tool holder. In this invention while the tube or mold may be stripped from the compact for various reasons, it represents an excellent bonding medium. Tube 28, for example, maintains its geometry throughout the process and although some melting may occur the finished compact is completely enclosed or encased in a metal capsule. In fact, the tube may be considerably bulged outwardly by the diamond mass and in some instances crystal outline may be observed from the outside. It is extremely difficult to remove from the melt in large pieces and it must be stripped off if removal is desirable. There is thus provided a large high strength compact within an integral tight sheath, casing or jacket which is easily joined by welding, soldering, brazing, etc., to a support. Alternately, however, the jacket may be removed from the compact and the compact then suitably attached to a tool holder or support. Where only a portion of tube 28 remains after stripping, such remaining portion is included in the term "jacket" when employed as a bonding element. The different tube metals that may be employed also facilitate soldering, brazing and joining methods.

It is understood that these objects and other features and advantages are achieved by providing a high purity method of growing diamonds. It is a preferred operation to utilize high purity materials in the specific metal shield feature. At this point, the entire assembly may be degassed or metal and nonmetal parts degassed separately. Ratcheting or preheating in the apparatus over an extended period of time is also desirable to stabilize pressure and temperature prior to diamond growth.

By these means the threshold pressure for diamond growth is considerably lowered because of the striking increase in nucleation. This nucleation increase provides at higher pressures a high strength compact representing a group of interlocking and intergrown diamond crystals tightly grown within an almost integral jacket or casing, and which is easily bonded, soldered, etc., to a tool holder to be employed as a diamond cutting and for abrading tool. The diamonds in the compact are grown very quickly and outwardly to the tube walls at even pressure conditions.

While specific methods and apparatus in accordance with this invention have been illustrated and described, it is not desired that the invention be limited to the particular descriptions or to the various configurations illustrated and it is intended by the appended claims to cover all modifications within the spirit and scope of this invention.

What I claim as new and desire to secure by Letters Patent of the United States is:

1. In a reaction vessel constituting an assembly of interfitting elements for enclosing a quantity of high purity carbonaceous material-catalyst combination therein whereby, when said reaction vessel is introduced into the reaction volume of a high pressure, high temperature apparatus for the simultaneous application of high pressure and heat to said reaction vessel by said apparatus, there is conversion of at least some of said quantity of carbonaceous material to diamond, the outer element of said reaction vessel being a hollow cylinder of electrically non-conductive, thermally insulating material selected from the group consisting of pyrophyllite, talc, catlinite and sodium chloride and having enclosed therewithin and concentric therewith a thin cylindrical tube extending the full length of said outer element for containing said quantity of high purity carbonaceous material-catalyst combination and means for introducing electrical current into said reaction vessel via a solid electrically-conducting disc disposed at each end of the reaction vessel assembly to effect heating of said quantity of carbonaceous material-catalyst combination, the improvement comprising:
 (a) said thin cylindrical tube being made of a metal selected from the group consisting of tantalum, tungsten, zirconium, titanium, nickel and nickel-base alloys and
 (b) a pair of spaced metal discs made of a metal selected from the aforementioned group located intermediate the ends of, and extending generally transversely of, the axis of said thin cylindrical tube for defining the vertical limits of a volume girded by said thin cylindrical tube,
  (1) said metal discs and thin cylindrical tube cooperating to protect against the entry of gaseous contaminants into said volume, when said volume is occupied by a charge of said carbonaceous material-catalyst combination and said reaction vessel is subjected to high pressure and heat.

2. The improvement substantially as recited in claim 1 wherein the spaced metal discs are flat.

3. The improvement substantially as recited in claim 1 wherein the spaced metal discs are substantially symmetrically disposed relative to the mid-point of the length of the thin cylindrical tube.

4. In a reaction vessel constituting an assembly of interfitting elements for enclosing a quantity of high purity carbonaceous material-catalyst combination therein whereby, when said reaction vessel is introduced into the reaction volume of a high pressure, high temperature apparatus for the simultaneous application of high pressure and heat to said reaction vessel by said apparatus there is conversion of at least some of said quantity of carbonaceous material to diamond, the outer element of said reaciton vessel being a first hollow cylinder of electrically non-conductive, thermally insulating material selected from the group consisting of pyrophyllite, talc, catlinite and sodium chloride; a thin cylindrical electrically conductive heater tube positioned within, contiguous and concentric with said outer element and extending the full length thereof; a second hollow electrically non-conductive cylinder positioned concentrically and contiguously within said heater tube; a metallic cylinder the length of which is less than that of said heater tube positioned concentrically and contiguously within said second cylinder for containing said quantity of material; a pair of plugs of electrically non-conductive material disposed one at either end of said metallic cylinder whereby electric current supplied to said reaction vessel via an electrically-conducting disc disposed at each end of and in contact with said heater tube is limited to passage through said heater tube, the improvement comprising:
 (a) said metallic cylinder being made of a metal selected from the group consisting of tantalum, tungsten, zirconium, titanium, nickel and nickel-base alloys and
 (b) a pair of spaced metal discs made of a metal selected from the aforementioned group located intermediate the ends of, and extending generally transversely of, the axis of said metallic cylinder for defining the vertical limits of a volume girded by said metallic cylinder, (1) said metal discs and metallic cylinder cooperating to protect against the entry of gaseous contaminants into said volume, when said volume is occupied by a charge of said carbonaceous material-catalyst combination and said reaction vessel is subjected to high pressure and heat.

5. The improvement substantially as recited in claim 4 wherein the spaced metal discs are flat.

6. The improvement substantially as recited in claim 4 wherein the spaced metal discs are substantially symmetrically disposed relative to the mid-point of the length of the metallic cylinder.

References Cited

UNITED STATES PATENTS

| | | | |
|---|---|---|---|
| 2,947,608 | 8/1960 | Hall | 23—209.1 |
| 2,947,609 | 8/1960 | Strong | 23—209.1 |
| 3,031,269 | 4/1962 | Bovenlerk | 23—209.1 |

EDWARD J. MEROS, *Primary Examiner.*